(12) United States Patent
Wang

(10) Patent No.: US 7,639,944 B2
(45) Date of Patent: Dec. 29, 2009

(54) METHOD FOR PROTECTING CROSS-RING SERVICE IN OPTICAL NETWORK

(75) Inventor: Guangjun Wang, Guangdong (CN)

(73) Assignee: Huawei Technologies Co., Ltd., Shenzhen, Guangdong Province (CN)

( * ) Notice: Subject to any disclaimer, the term of this patent is extended or adjusted under 35 U.S.C. 154(b) by 553 days.

(21) Appl. No.: 10/592,293

(22) PCT Filed: Jun. 6, 2006

(86) PCT No.: PCT/CN2006/001224
§ 371 (c)(1),
(2), (4) Date: Sep. 8, 2006

(87) PCT Pub. No.: WO2007/003091

PCT Pub. Date: Jan. 11, 2007

(65) Prior Publication Data
US 2008/0232802 A1    Sep. 25, 2008

(30) Foreign Application Priority Data
Jul. 6, 2005    (CN) .................. 2005 1 0035874

(51) Int. Cl.
*H04J 14/00*    (2006.01)
(52) U.S. Cl. ................... 398/3; 398/5; 398/59
(58) Field of Classification Search ............. 398/1–5, 398/7, 9, 58, 59
See application file for complete search history.

(56) References Cited

U.S. PATENT DOCUMENTS

| | | | |
|---|---|---|---|
| 5,491,686 A | | 2/1996 | Sato |
| 7,035,206 B2 * | | 4/2006 | Brewer et al. ............ 370/222 |
| 7,167,444 B1 * | | 1/2007 | Afferton ................... 370/222 |
| 2003/0063617 A1 * | | 4/2003 | Limaye et al. ............ 370/406 |
| 2003/0147354 A1 | | 8/2003 | Gebhardt, Jr. et al. |
| 2005/0265365 A1 * | | 12/2005 | Wan ........................ 370/401 |

FOREIGN PATENT DOCUMENTS

CN    1189269    7/1998

(Continued)

OTHER PUBLICATIONS

J.J. Shi, et al; "Analysis and design of survivable telecommunications networks", IEE Proceedings: Communications, Institution of Electrical Engineers, GB, vol. 144, No. 5, Oct. 14, 1997, pp. 322-330 XP006008480.

(Continued)

*Primary Examiner*—Dalzid Singh
(74) *Attorney, Agent, or Firm*—Ladas & Parry LLP

(57) ABSTRACT

A method for protecting a cross-ring service in an optical network includes the steps of: determining whether a configured working path crosses different rings; and in the case that the working path crosses different rings, establishing a cross-ring protection path which bypasses an off-ring node or an on-ring node of the working path on a ring, and binding the cross-ring protection path and the working path, wherein the cross-ring protection path and the working path is bound, and thus a protection can be implemented for the cross-ring service when the off-ring node or the on-ring node fails, with a reduced occupancy of bandwidth in comparison with the conventional DNI method.

8 Claims, 4 Drawing Sheets

FOREIGN PATENT DOCUMENTS

CN         1379936        11/2002
EP         1 217 775      6/2002

OTHER PUBLICATIONS

Ramesh Bhandari; "Optimal Physical Diversity Algorithms and Survivable Networks", Computers and Communications, 1997. Proceedings, Second IEEE Symposium on Alexandria, Egypt, Jul. 1-3, 1997, Los Alamitos, CA, USA, IEEE Comput. Soc, US, Jul. 1, 1997, pp. 433-441; XP010241387.

Xi Yang, et al; "Survivable Lightpath Provisioning in WDM Mesh Networks Under Shared Path Protection and Signal Quality Constraints", Journal of Lightwave Technology, XX, XX vol. 23, No. 4, Apr. 2005, pp. 1556-1567, XP011130780.

J. Roldan, et al; "Application of Dual-Access Architecture, with Drop and Continue Feature, to WDM Optical Networks", Technology and Infrastructure, XX, XX, Jun. 23, 1998, pp. 259-266, XP002161771.

Demetrios Stamatelakis, et al; "IP Layer Restoration and Network Planning Based on Virtual Protection Cycles", IEEE Journal on Selected Areas in Communications, IEEE Service Center, Piscataway, US, vol. 18, No. 10, Oct. 2000, XP011055237.

European Search Report dated Mar. 28, 2008; Application No./Patent No. 06742110.7-2415 PCT/CN2006/001224.

International Search Report issued for PCT/CN2006/001224, dated Aug. 24, 2006.

* cited by examiner

METHOD FOR PROTECTING CROSS-RING SERVICE IN OPTICAL NETWORK

FIELD OF THE INVENTION

The present invention relates to the filed of optical communication technologies, and particularly to a method for protecting a cross-ring service in an optical network.

BACKGROUND OF THE INVENTION

Figure 1:
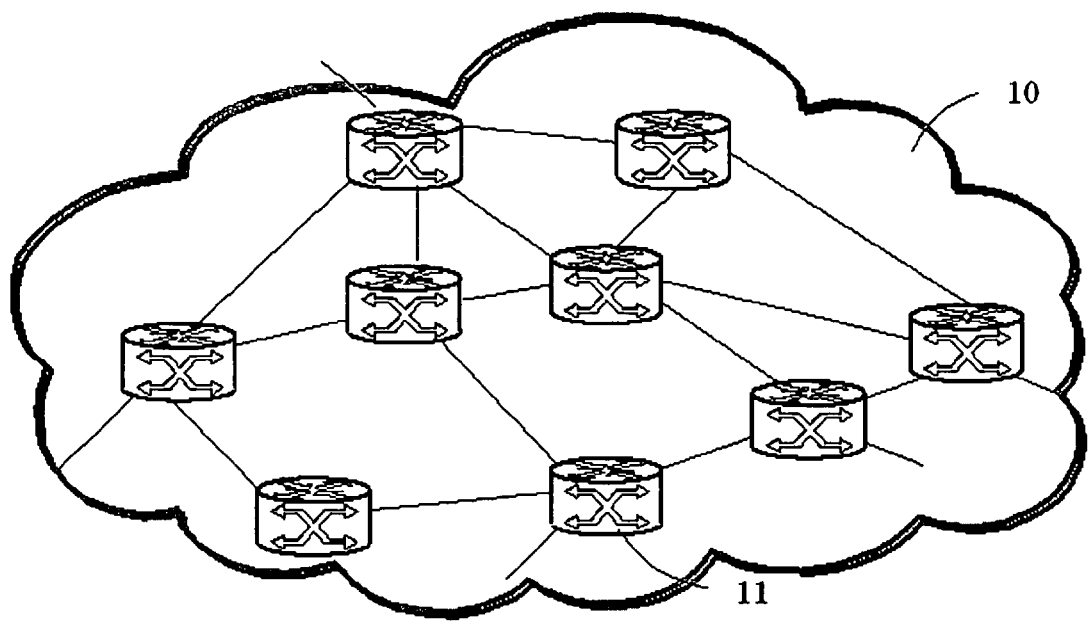

The optical network topology has experienced an isolated node, a linear topology and a ring topology. At present, many networks have been provided with a topology of Mesh or quasi-Mesh Network. An optical Network 10 as shown in FIG. 1 includes a plurality of nodes 11 interconnected by a Mesh topology. The protection switching technique also has developed synchronously with the evolution of networks. ITU recommendations such as G.783, G.841, G.842 and the like provide protection methods applicable for a Link Network and a Ring Network, such as, MSP (Multiplex. Section Protection) 1+1, MSP 1:n, UPSR (Unidirectional Path Switched Ring), BLSR (Bi-directional Line Switching Ring), etc., which have been used wildly.

Although the Mesh Network topology has been used in an optical network system for some time, the protections for a transport plane mainly are a linear protection and a ring protection. The protection for a cross-ring (i.e. a protection ring) service mostly adopts a DNI (Dual-Node Interconnection) method. However, this DNI method relatively wastes resources and also has certain demands on the network structure, that is, a dual-node interconnection is generally required, and the configuration thereof is relatively complicated.

Figure 2:
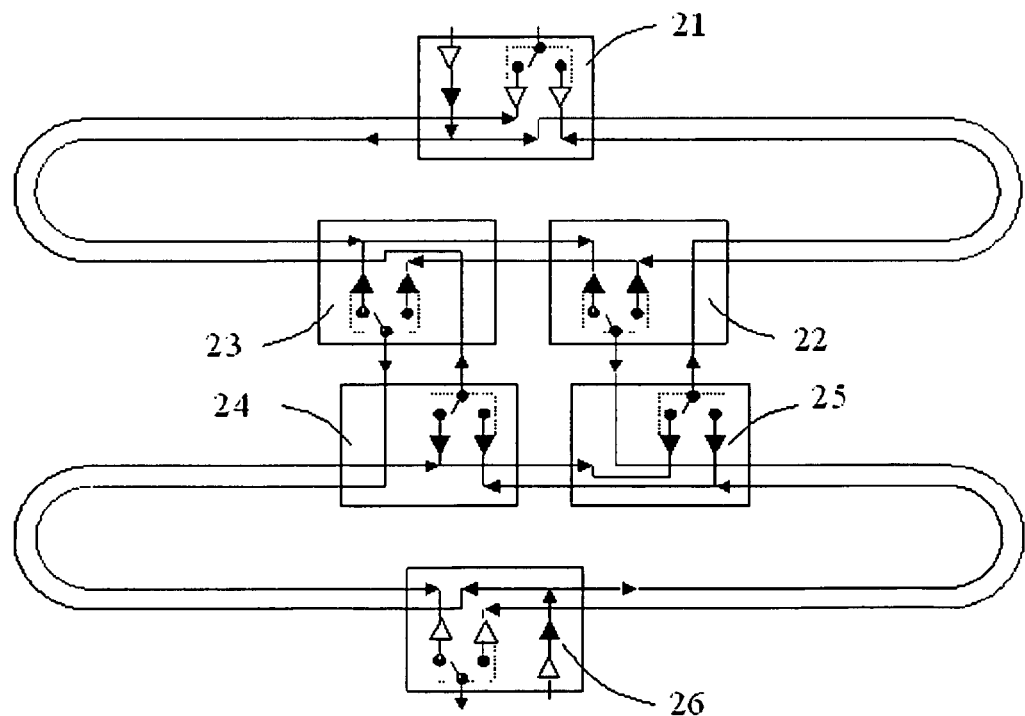

FIG. 2 shows a schematic diagram of a DNI protection with an SNCP (Sub Network Connection Protection), wherein a ring includes nodes 21, 22, 23 and a ring includes nodes 24, 25, 26 are interconnected via a pair of nodes 23, 24 and a pair of nodes 22, 25. According to this solution, each service is adapted to an SNCP service, where a dual-transmission of the service must be performed on an on-ring node and two interconnected nodes of a present ring, and a selective reception of the service can be performed on the two interconnected nodes of another ring and an off-node of the service of another ring. Since in this solution each cross-ring service needs the dual-transmission, a great deal of bandwidth resources may be occupied, and the configuration process may be very complicated. Moreover, this solution may be only applicable for the case of the dual-node interconnection, and fail to provide an effective protection for the case where the rings are interconnected merely via a single node or share no common node.

Also, a method interconnecting rings with the Multiplex Section can provide such a protection. Generally, this method performs a service dual-transmission on interconnected local-ring nodes, and performs a selective reception on interconnected nodes at the same side of another ring. The configuration process for this method may be complicated which requires a manual configuration), and the bandwidth on a Multiplex Section ring may be occupied excessively (in particular when the interconnected nodes are not adjacent ones on the ring). Moreover, this solution may be only applicable for the case of a dual-node interconnection, and fail to provide an effective protection for the case where the rings are interconnected merely via a single node or share no common node.

SUMMARY OF THE INVENTION

The present invention provides a method for effectively protecting a cross-ring service in an optical network to overcome disadvantages of a low bandwidth utilization ratio and a strict requirement on the network topology in connection with the Dual-Node Interconnection method in the prior art used for the cross-ring service.

An embodiment of the present invention provides a method for protecting a cross-ring service in an optical network, wherein the method may include the steps of:
determining whether a configured working path crosses different rings; and
in the case that the working path crosses different rings, establishing a cross-ring protection path which bypasses an off-ring node or an on-ring node of the working path on a ring, and binding the cross-ring protection path and the working path.

Preferably, the method may further include the steps of:
selecting a first node, other than the off-ring node, on a first ring including a service transmitting node, and selecting a second node, other than the on-ring node, on a second ring including a service receiving node, wherein the first node and the second node are located on the working path;
establishing the cross-ring protection path with the first node being as an origination node and the second node being as a termination node; and
binding the cross-ring protection path and a corresponding protected section of the working path, wherein the origination node and the termination node of the protected section are respectively the first node and the second node, and the protected section includes the off-ring node or the on-ring node.

Preferably, the cross-ring protection path may be established through Resource Reservation Protocol-Traffic Engineering Protocol, Open Shortest Path First-Traffic Engineering Protocol or Intermediate System-Intermediate System-Traffic Engineering Protocol.

Preferably, the method may further include the step of:
a node for selectively receiving a service on the working path and the cross-ring protection path performing a transfer for a point of selectively receiving a service according to a ring switching status.

Preferably, in the case that the ring in which the node for a selective reception is located operates normally, the node for a selective reception may selectively receive a service on the working path and the cross-ring protection path.

Preferably, in the case that a section protection switching occurs to the ring in which the node for a selective reception is located, the node for a selective reception may selectively receive a service on an on-ring identical-direction protection path in the and the cross-ring protection path.

Preferably, in the case that a ring protection switching occurs to the ring in which the node for a selective reception is located, the node for a selective reception may selectively receive a service on an on-ring opposite-direction protection path in the and the cross-ring protection path.

Preferably, a 1+1 or 1:1 protection may be adopted for the working path and the cross-ring protection path.

Preferably, the working path may cross rings interconnected via a single node or dual nodes or without a common node.

According to the method for protecting a cross-ring service in an optical network in the embodiments of the present invention, with an establishment of a cross-ring protection path and a binding between the cross-ring protection path and a working path, a protection can be implemented for a service crossing rings interconnected via a single node. Moreover in comparison with the conventional Dual-Node Interconnection, the embodiments of the present invention can reduce the occupancy of bandwidth resource on the Multiplex Section and improve the bandwidth utilization ratio. In addition, the embodiments of the present invention can provide a protection for a service crossing rings interconnected via dual nodes or without an interconnecting node, thus enabling an effective protection for a cross-ring service in an optical network.

BRIEF DESCRIPTIONS OF THE DRAWINGS

Figure 3:
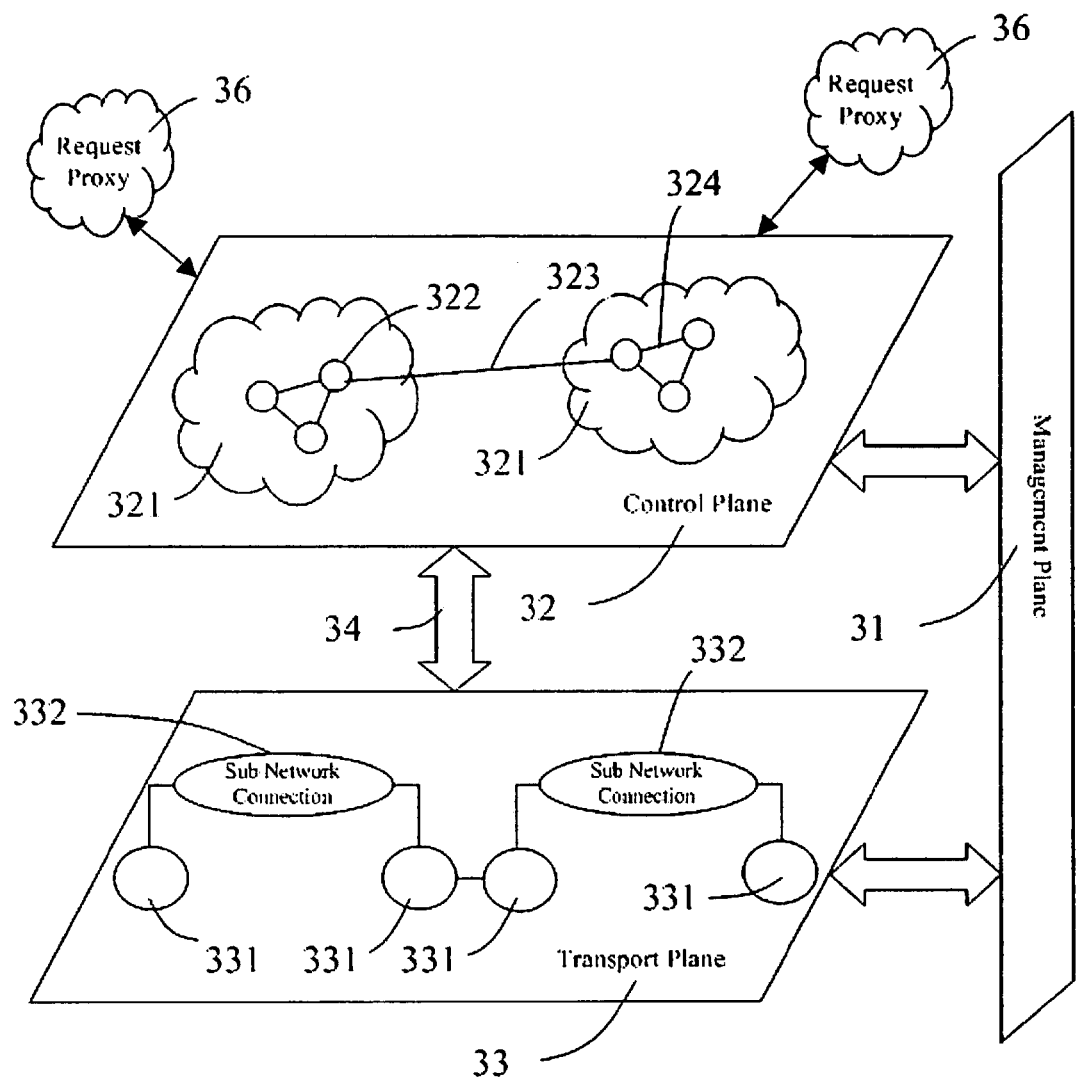
Figure 4:
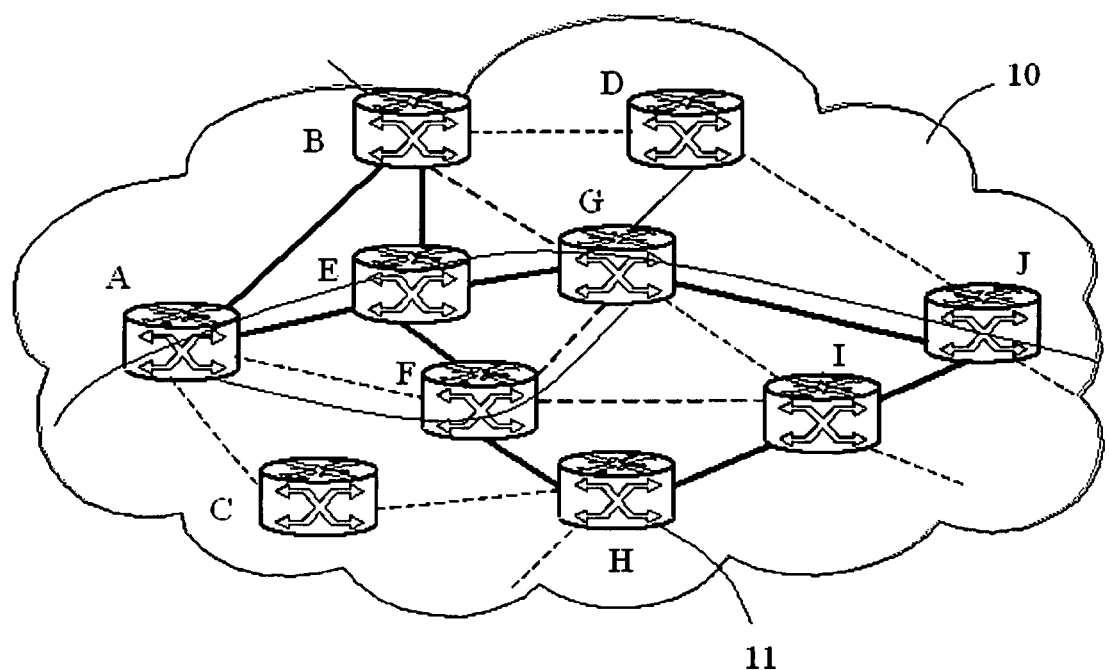
Figure 5:
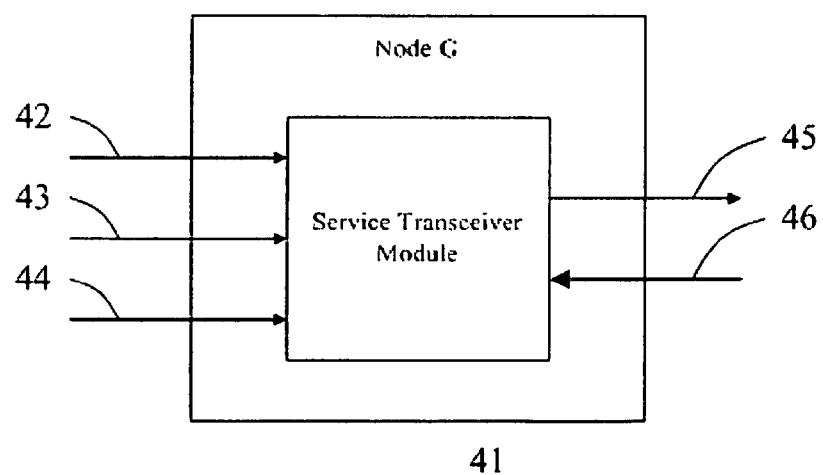
Figure 6:
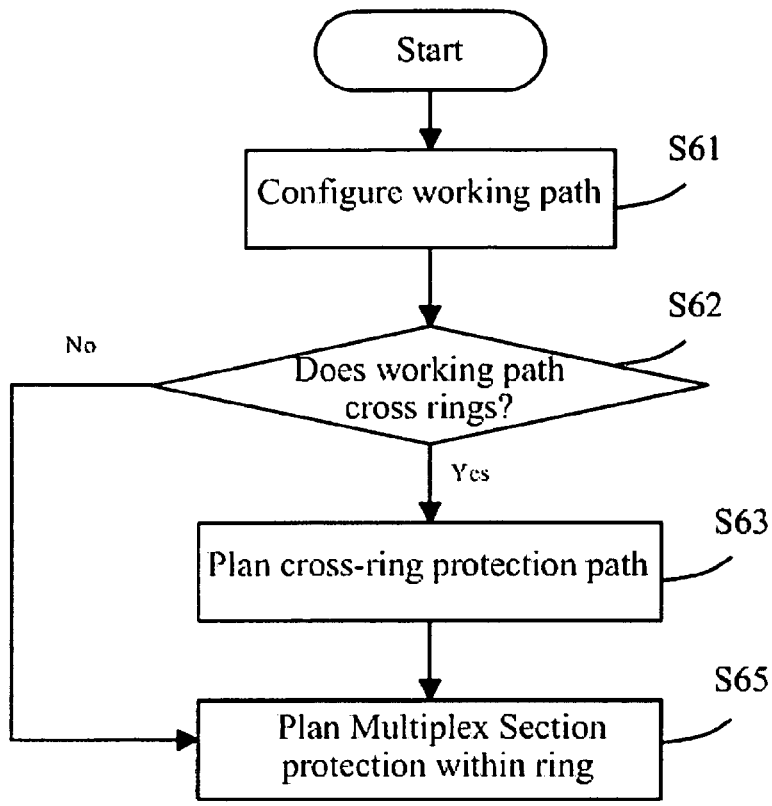
Figure 7:
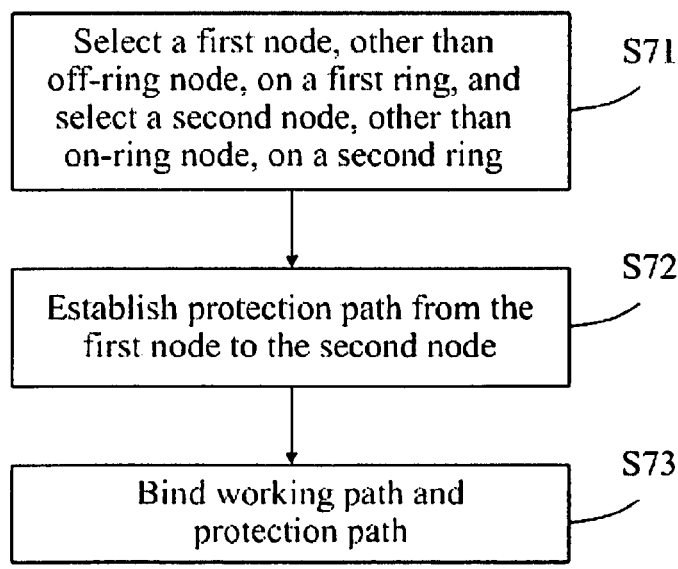

FIG. 1 is a schematic diagram of a Mesh Network topology in the prior art;
FIG. 2 is a schematic diagram of a Dual-Node Interconnection of a Sub Network Connection Protection ring according to the prior art;
FIG. 3 is a schematic diagram of a layered architecture of an optical network;
FIG. 4 is a schematic diagram of a service path according to an embodiment of the present invention;
FIG. 5 is a structural schematic diagram of node G shown in FIG. 4;
FIG. 6 is a flow chart of a method for protecting a cross-ring service in an optical network according to an embodiment of the present invention; and
FIG. 7 is a detailed flow chart of the step of planning a cross-ring protection path shown in FIG. 6.

DETAILED DESCRIPTIONS OF THE EMBODIMENTS

The present invention will be further described hereinafter with reference to the drawings and the embodiments so as to make the principle, characteristics and advantages thereof more apparent.

As shown in FIG. 3, an optical network generally includes three logical planes, i.e. Transport Plane 33, Control Plane 32 and Management Plane 31. Control Plane 32 and Transport Plane 33 are connected respectively with Management Plane 31, and are connected with each other via Connection Control Interface 34.

Transport Plane 33 includes transport network nodes 331 which are switching entities and interconnected through Sub Network Connection 332. Transport Plane 33 generally performs the functions of connecting/disconnecting, switching (routing), transporting and the like so as to provide a unidirectional or bi-directional information transport from one end point to another as well as a transport of some control information and network management information.

Control Plane 32 performs the functions of call control, connection control and the like within an intelligent optical network. Control Plane 32 is supported by a signaling network and includes a plurality of functional components, such as a group of communication entities, Control Unit 322 (e.g. an optical connection controller) and a corresponding internal network node interface 324. The communication entities and Control Unit 322 respectively compose a plurality of Management Domains 321 interconnected via an external network node interface 323. The communication entities and Control Units 322 are primarily used for transferring a transport network resource and provide the functions related to establishing, maintaining and disconnecting (releasing the network resource) a connection. Among these functions, the functions of signaling and routing are the most important. In addition, Control Plane 32 is also connected to Request Proxy 36 via UNI (User Network Interface). A method for protecting a cross-ring service according to an embodiment of the present invention is implemented by Control Plane 32.

Management Plane 31 manages Control Plane 32 and Transport Plane 33. While managing an optical transport network and the nodes 331, Management Plane 31 provides an efficient communication function between a network operation system and the nodes 331.

FIG. 4 is a schematic diagram of a service path according to an embodiment of the present invention. A solid line in the figure indicates a path with a ring protection, and a dashed line indicates a path without a ring protection. As shown, nodes A, B and E form a first ring, nodes E, F, H, I, J and G form a second ring, and the first ring and the second ring are interconnected via single node E.

It can be assumed that a service goes via four nodes A, E, G and J. The service can obtain a good protection respectively in the first ring and the second ring. For example, when fiber section AE in the first ring breaks, a service protection can be implemented via ABE, or when node G in the second ring fails, a service protection can be implemented via EFHIJ. However, if interconnecting node E fails, the service can not obtain a good protection. The service cannot be protected even with a Dual-Node Interconnection (DNI) method, because there is one common node E between the two rings.

Referring to FIG. 6, it is a flow chart of a method for protecting a cross-ring service in an optical network according to an embodiment of the present invention. When configuring a cross-ring protection path, Control Plane 32 firstly configures a working path, i.e. path AEGJ in FIG. 4 (step S61). The configuration for the working path can be performed though Resource Reservation Protocol-Traffic Engineering (RSVP-TE) Protocol, Open Shortest Path First-Traffic Engineering (OSPF-TE) Protocol, Intermediate System-Intermediate System-Traffic Engineering (ISIS-TE) Protocol and the like of Generalized Multi-Protocol Label Switching (GMPLS). Upon completion of the working path configuration, Control Plane 32 determines whether the working path crosses different rings, i.e., whether a service transmitting node and a service receiving node are located in the same ring (step S62).

If the service transmitting node and the service receiving node are located in the same ring, it goes to step S65 of planning a Multiplex Section protection respectively within the two rings, otherwise Control Plane 32 plans a cross-ring protection route at two adjacent nodes on the working path on both sides of node E that interconnects the two rings (through RSVP-TE, OSPF-TE or ISIS-TE Protocol), establishes a cross-ring protection path bypassing node E based upon a practical use status of bandwidth, and binds the cross-ring protection path and a corresponding section of the working path, wherein the corresponding section of the working path and the cross-ring protection path have the same origination node and include node E (step S63), as will be described in detail with reference to FIG. 7. When the common node of the two rings (node E in FIG. 4) fails, a cross-ring service 1+1 protection can be implemented through the cross-ring protection path (e.g. path AFG), wherein the service is transported simultaneously on two channels/links which do not intersect (the working channel/link and the protection channel/link), and thus those high-quality signals can be selected at the receiving end. 1:1 protection can also be implemented, wherein the service is only transported on the working channel/link, and the protection channel/link does not transport a service or transports a service with a low priority; and when the working channel/link fails, the service can be switched from the working channel/link to the protection channel/link, and the low-priority service on the protection channel/link may be dropped. When a fiber breaks somewhere in the ring, a service protection (Multiplex Section protection) can be performed within the ring. Practically, the order of planning a Multiplex Section protection within a ring and planning a cross-ring protection path can be contrary to that as shown in FIG. 6.

Referring to FIG. 7, it is a detailed flow chart of step of planning a cross-ring protection path shown in FIG. 6. Firstly, a first node, other than an off-ring node (node E in this embodiment), is selected in the first ring, and a second node, other than an on-ring node (also node E in this embodiment), is selected in the second ring. Referring to FIG. 4, it can be assumed that AF and FG have available bandwidth resources, and the first node can be node A and the second node can be node G, wherein the first node and the second node are located on the working path, i.e., path AEGJ (step S71). Control Plan 32 can establish a cross-ring protection path from the first node (node A) to the second node (node G) (step S72), and bind the cross-ring protection path AFG and the section AEG of the working path, and thus the 1+1 protection can be implemented for the path between AFG and AEG (step S73).

Practically, if AB and BG have available bandwidth resources, then the first node may be node A, the second node may be node G, and the cross-ring protection path may be path ABG. In addition to the first node and the second node, the cross-ring protection path can include a plurality of intermediate nodes. The configuration for the protection path can be achieved through such techniques as OSPF-TE (Open Shortest Path First-Traffic Engineering) or the like based upon constraint information of each link, the use status of bandwidth and the like In addition, when the service is transported through rings which are adjacent indirectly, the service protection can also be achieved through the above method. The difference is that the off-ring node and the on-ring node are not coincident.

It can be assumed that the cross-ring protection path is path AFG, and a dual-transmission of the service can be performed at node A, and a selective reception of the service can be performed at node G. When the common node E of the first ring and the second ring fails, path AFG may take the place of path AEG for a service path switching.

When a section switching or ring switching occurs due to a failure of section EG for the second multiplex ring EFHIJG, a transfer for a point selectively receiving the service may be required, that is, node G is required to select a high-quality service for a selective reception from the service on protection channel E-F-H-I-J-G corresponding to working path EG after the switching and the service on path AFG, as detailed process in FIG. 5.

In FIG. 5, node G includes Service Transceiver Module 41, and is connected with a westward working channel 42, a westward protection channel 43 (a protection channel within the ring, which has an identical direction), an eastward working channel 45 and an eastward protection channel 46 (a protection channel within the ring, which has an opposite direction). Here, when working channel AEGJ is in a normal status, the service is transported in the westward working channel 42; when the section switching occurs on section EG for the second ring EFHIJG, the service on working path AEGH may be switched to the westward protection channel 43, and all the services from G to J on the second ring EFHIJG may be transported on the eastward working channel 45; and when the ring switching occurs on section EG for the second ring EFHIJG, the service from E to G may be received on the eastward protection channel 46. In addition, node G is connected with the cross-ring protection channel 44 so as to achieve a protection for a cross-ring service when node E for interconnecting rings fails.

Therefore, node G receives selectively the services in FIG. 4 the way as following: when no protection switching occurs on section EG of the second ring EFHIJG, Service Transceiver Module 41 selects and receives a service from the westward working channel 42 and the westward protection channel 43, and transfers the service to the eastward working channel 45; when the section protection switching occurs on section EG of the second ring EFHIJG, Service Transceiver Module 41 selects and receives a service from the westward protection channel 43 and the cross-ring protection channel 44, and transfers the service to the eastward working channel 45; and when the ring protection switching occurs on section EG of the second ring EFHIJG, Service Transceiver Module 41 selects and receives a service from the cross-ring protection channel 44 and the eastward protection channel 46, and transfers the service to the eastward working channel 45.

As shown in FIG. 4, in the case of using the conventional Dual-Node Interconnection, the resource on path ABEFHIJ has to be occupied in order to achieve a protection for the service on cross-ring path AEGJ. Moreover, the Multiplexing Section protection (protection for path ABE and protection for path EFHIJ, respectively) is also provided in each of the two rings (ring ABE and ring EGJIHF). Thus, in order to achieve the protection for the service on cross-ring path AEGJ, the bandwidth on path ABEFHIJ has to be occupied twice that for the service. However, the method according to the embodiment of the present invention only adopts one service channel and one protection channel as described above, and therefore when working path AEGJ is in a normal status, the service is transferred in a working path and when the ring fails, a corresponding section switching is performed so as to switch the service on the failed working path to a corresponding protection path. Therefore, it is merely to occupy a service-corresponding bandwidth on working path AEGJ (or a corresponding protection path in the ring) or path AFG.

The present invention has been described and illustrated by way of the embodiments of the present invention with reference to the drawings, it shall be recognized by those skilled in the art that those embodiments and drawings are merely illustrative and not restrictive, that the present invention shall be not limited thereto, and that various modifications and variations can be made thereto in light of the descriptions and the drawings without departing from the sprit and scope of the present invention as defined by the accompanying claims.

What is claimed is:

1. A method for protecting a cross-ring service in an optical network, wherein comprising the steps of:
   establishing a cross-ring protection path which bypasses an off-ring node or an on-ring node of a cross-ring working path on a ring, which comprises the steps of:
   selecting a first node, other than the off-ring node, on a first ring comprising a service transmitting node, and selecting a second node, other than the on-ring node, on a second ring comprising a service receiving node, the first node and the second node being located on the working path; and
   establishing the cross-ring protection path with the first node being as an origination node and the second node being as a termination node; and
   binding the cross-ring protection path and the working path, which comprises the step of:
   binding the cross-ring protection path and a corresponding protected section of the working path, wherein the origination node and the termination node of the protected section are respectively the first node and the second node, and the protected section comprises the off-ring node or the on-ring node.

2. A method for protecting a cross-ring service in an optical network according to claim 1, wherein the cross-ring protection path is established through Resource Reservation Protocol-Traffic Engineering Protocol, Open Shortest Path First-Traffic Engineering Protocol or Intermediate System-Intermediate System-Traffic Engineering Protocol.

3. A method for protecting a cross-ring service in an optical network according to claim 1, further comprising the step of:
   a node for selectively receiving a service on the working path and the cross-ring protection path performing a transfer for a point of selectively receiving a service according to a ring switching status.

4. A method for protecting a cross-ring service in an optical network according to claim 3, further comprising the step of:
   in the case that the ring in which the node for a selective reception is located operates normally, the node for a selective reception selectively receiving a service on the working path and the cross-ring protection path.

5. A method for protecting a cross-ring service in an optical network according to claim 3, wherein in the case that a section protection switching occurs to the ring in which the node for a selective reception is located, the node for a selective reception selectively receives a service on an on-ring identical-direction protection path and the cross-ring protection path.

6. A method for protecting a cross-ring service in an optical network according to claim 3, wherein in the case that a ring protection switching occurs to the ring in which the node for a selective reception is located, the node for a selective reception selectively receives a service on an on-ring opposite-direction protection path and the cross-ring protection path.

7. A method for protecting a cross-ring service in an optical network according to claim 1, wherein a 1+1 or 1:1 protection is adopted for the working path and the cross-ring protection path.

8. A method for protecting a cross-ring service in an optical network according to claim 1, wherein the working path crosses rings interconnected via a single node or dual nodes or without a common node.

* * * * *

UNITED STATES PATENT AND TRADEMARK OFFICE
CERTIFICATE OF CORRECTION

PATENT NO.       : 7,639,944 B2                                   Page 1 of 1
APPLICATION NO.  : 10/592293
DATED            : December 29, 2009
INVENTOR(S)      : Guangjun Wang It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 665 days.

Signed and Sealed this

Ninth Day of November, 2010

David J. Kappos
*Director of the United States Patent and Trademark Office*